Oct. 21, 1952 S. H. KATZ 2,614,655
FILTER MATERIAL
Filed Aug. 10, 1943
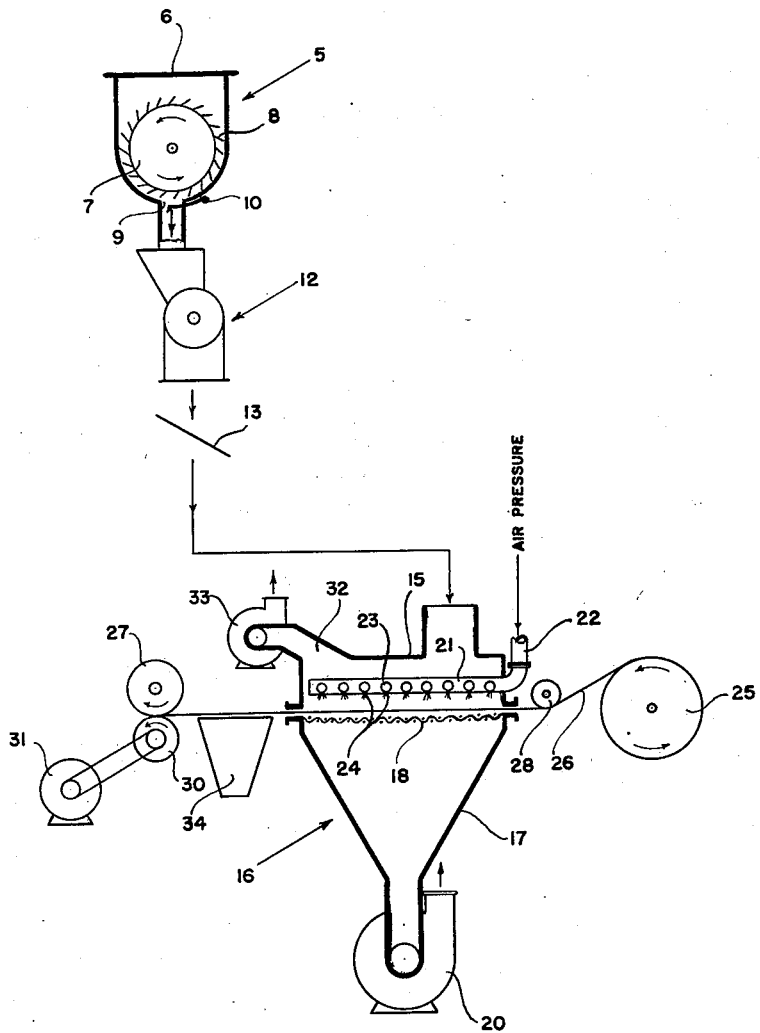
Inventor
Sidney H. Katz
By Joseph A. O'Connell and
Fred S. Lockwood
Attorneys

UNITED STATES PATENT OFFICE 2,614,655

FILTER MATERIAL

Sidney H. Katz, Edgewood Arsenal, Md., assignor to the United States of America as represented by the Secretary of War Application August 10, 1943, Serial No. 498,062

2 Claims. (Cl. 183—44)

(Granted under the act of March 3, 1883, as amended April 30, 1928; 370 O. G. 757)

The invention described herein may be manufactured and used by or for the Government for governmental purposes, without the payment to me of any royalty thereon.

This invention relates, generally, to fiber mediums for use in connection with gas masks and the like, and it has particular relation to filter mediums impregnated with finely divided, dry asbestos fibers so as to have great resistance to deterioration by oil or liquid smokes or fogs, and high filtering efficiency with relatively low air resistance.

In general, the canisters of gas masks and collective protectors used for protection against chemical warfare agents, contain two types of air purifying mediums. One of these mediums is the so-called "mechanical filter" or "filter" which is adapted to remove exceedingly small solid and liquid smoke particles floating in the air such as diphenylaminechlorarsine, diphenylchlorarsine, diphenylcyanarsine, and chloracetophenone. The other purifying medium usually comprises a mixture of activated charcoal granules and soda lime or other granular absorbents, and has the function of removing toxic vapor molecules from the air by adsorption and chemical reaction, such as, phosgene, chlorpicrin, mustard gas, lewisite, and chloracetophenone. The mechanical filter is, generally, in the form of a pad or multilayer web of fibers held together in any convenient form and so arranged that the inspired air passes therethrough, wherein the irritant smoke particles are caught and retained in the fibrous meshes, allowing the air with the toxic vapors to pass on through to the charcoal and soda lime wherein the final stages of purification in the canister take place.

The mechanical filters have been made from a variety of fibrous materials such as felt, cotton pads, water-laid paper webs, air-laid webs, and fabrics. Prior to this invention, the best all-around filter material was a water-laid paper web of the type commonly known as filter paper, which had been impregnated with minute carbon particles. More specifically, the standard filter material in use prior to this invention, and which was considered the best available, was a filter paper web having an alpha cellulose content of 90% or more, a basis weight of about 30 to 60 pounds, a web thickness of about 0.012 to 0.030 of an inch, and an air resistance of about 5 to 12 mm. of water as described hereinafter, which filter paper web had been impregnated with minute carbon particles by drawing the smoke from burning acetylene through the paper. The mechanical filter consisted of a plurality of layers of this paper web.

However, with the development of oil smoke for large scale screening operations, that is, smoke generated by the vaporization of suitable grades of petroleum, it was found that sufficient concentrations of this type of smoke were set up to cause the rapid deterioration of the standard filter elements used in the canisters thereby permitting subsequent penetration by excessive amounts of toxic smokes, which it was the primary function of these filter elements to remove from the inspired air. On investigation, it was found that the deteriorating effect of the oil screening smokes was due primarily to their action on the fine particles of carbon impregnated into the paper. Filters made of unimpregnated alpha web were tested and found to be affected to little or no extent by the oil screening smokes. Of course, the unimpregnated alpha webs cannot be used as such since they do not afford sufficient protection against toxic smoke without excessive air resistance. Accordingly, it became urgently necessary to discover some material other than carbon with which to impregnate the mechanical filter, which material would not be subject to deterioration by the oil smokes, and which would impart high filtering efficiency with relatively low air resistance.

Of the many different materials which might conceivably be used to replace carbon, such as, glass wool, calcium silicate, pumice, talc, ester gum, rosin and asbestos, only asbestos was found to be at all promising and suitable. It was first attempted to incorporate the asbestos by mixing a water suspension thereof with the cellulose fiber pulp, and feed this stock to a paper making machine. However, difficulty was experienced in practicing this method because of the loss of a considerable amount of the most desirable finely divided, asbestos fibers which were not retained in the water-laid web, but which passed on with the water leaving the cylinder, and because the resulting asbestos-bearing paper lacked good filtering efficiency, and had a relatively high air resistance. Furthermore, it was difficult to make a uniform grade of asbestos-bearing paper by this method on a quantity production basis. This type of paper made by blending asbestos and cellulose pulp into the stock is referred to as "asbestos bearing" paper.

It was conceived according to the present invention that perhaps the asbestos could be satisfactorily incorporated into a filter paper web in the form of air-floated, dry asbestos fibers. The great mobility of the asbestos fibers suspended in the air would tend to equalize the porosity of the paper web, and the finest fibers, most desirable for forming the filters, would be mostly retained in the filter paper. On experimentation, it was found that this new method was satisfactory and that a filter material having very desirable properties could be manufactured thereby, the details of which are described hereinafter.

Accordingly, the primary object of this invention is the provision of an improved filter medium for use in connection with gas masks and the like, adapted to manufacture on a quantity production basis, and characterized by its great resistance to deterioration by oil smokes, and its high filtering efficiency for toxic and irritant, solid and liquid smoke particles with relatively low air resistance.

A further, and very important object of this invention is the provision of a high grade mechanical filter material for gas masks and the like, comprising a fibrous filter support impregnated with finely divided, dry asbestos.

A more specific object of this invention is the provision of an improved filter for gas masks and the like, comprising a high alpha content, filter paper web impregnated with air-floated, finely divided, dry asbestos fibers.

Other objects of the invention will, in part, be obvious and will, in part, appear hereinafter.

For a more complete understanding of the nature and scope of this invention, reference may be had to the following detailed description thereof setting forth by way of illustration certain presently preferred specific embodiments, taken in connection with the single drawing which diagrammatically shows one type of machine in which asbestos impregnated filter material may be made according to this invention.

Several different fibrous materials may be used into which the finely divided, dry asbestos fibers may be impregnated, such as filter paper, felt, and air-laid webs of cotton linters. Although felt has a relatively low air resistance with good filtering efficiency, it is not entirely satisfactory from a mechanical standpoint since it does not withstand well the normal stresses encountered in the impregnating process and in the canister manufacture, without stretching out of shape. However, in certain types of canister designs this mechanical weakness of felt would not be an important factor. A fibrous web formed from air-laid cotton linters may also be impregnated with dry asbestos fibers to form a filter having desirable properties. However, the presently preferred base material is a high alpha cellulose content, filter paper web of the type previously used for impregnation with acetylene smoke, but preferably having a lower air resistance.

The most suitable type of filter paper to date appears to be one having a fuzzy surface, a soft texture, an alpha cellulose content of 90% or greater, a basis weight of 30 to 60 pounds, a web thickness of from about 0.012 to about 0.030 of an inch, and an air resistance of from about 3.6 to about 18 mm. of water as described hereinafter. Preferably the filter paper should be one the air resistance of which is in the lower part of the range permitted. For example an air resistance of around 4 mm. of water is very satisfactory. It has been found that even tiny holes in the low air resistance filter paper may be tolerated since impregnation with the dry asbestos fibers mends or fills up such tiny holes. The fuzzy surface on the paper is needed so that the asbestos will penetrate and adhere to it.

In determining the air resistance of individual layers or sheets of filter paper, air is passed through a 100 sq. cm. sample of the paper at a rate of flow of 85 liters per minute, and the pressure drop is measured with a manometer in millimeters of water.

Prior to this invention it had been found that filter paper of the type used for the mechanical filters of gas masks, could be satisfactorily waterproofed with methylsilicon chlorides. This waterproofing was carried out by exposing the filter materials to be waterproofed to a vapor-air mixture of methylsilicon chlorides, and after a time-lapse of about 24 hous, neutralizing the acid formed by treatment with ammonia vapor. The acid formed by treatment with the methylsilicon chlorides progressively weakens the filter materials. Neutralization of the acid with ammonia serves to halt and prevent further weakening of the paper. However, a greater waterproofing effect is obtained if the neutralization with ammonia is deferred to the latest possible time without resulting in weakening the filter material below a predetermined minimum.

Although it was not thought that the waterproofing treatment would have any effect on, or connection with, the filtering quality of the asbestos impregnated material, from a number of tests conducted, there appears to be a definite and unexpected indication that for some reason or other the waterproofing treatment improves the filtering quality of the asbestos impregnated material.

The following table gives information on the different types of filter paper which may be used:

*Table I*

| Type of Paper | Manufacturer | Web Thickness, inch | Air Resistance of Web in mm. Water |
|---|---|---|---|
| Asbestos bearing | Knowlton Bros | 0.023 | 13.8 to 18 |
| Do | do | 0.023 | 13.8 to 18 |
| Alpha Web | Brown Co | 0.020 | 6.9 |
| Do | do | 0.013 | 3.8 |
| Linters base | J. A. Manning | 0.019 | 3.8 |
| Do | do | 0.019 | 3.8 |
| Do | Knowlton Bros | 0.022 | 6.5 |
| Do | do | 0.022 | 6.5 |
| Do | do | 0.022 | 7.0 |
| Do | do | 0.020 | 3.6 |
| Do | do | 0.020 | 3.6 |
| Do | do | 0.020 | 3.7 |
| Do | J. A. Manning | 0.018 | 4.2 |
| Do | do | 0.022 | 6.8 |
| Alpha Web | Brown Co | 0.020 | 6.7 |
| Asbestos bearing | Knowlton Bros | 0.020 | 16.0 to 18.0 |

Several different grades or types of asbestos have been used for the impregnation of filter materials. Table II contains a list of the various types and grades of asbestos which have been used, indicating the source from which obtained, and giving certain other pertinent information.

Table II

| Type of Asbestos | Source from which obtained | Manufacturer's Grade | Remarks |
|---|---|---|---|
| African Blue | Johns Manville | #1206 | Air-separated for cleaning. |
| Vermont Asbestos Float | The Ruberoid Co | | Very few fibers or rod shaped particles. |
| Medium Fiber Acid-washed Amphibole. | Fisher Scientific Co. and Eimer and Amend. | Gooch | |
| Maryland Acid-washed Micronized. | Powhatan Mining Co | Gooch | First part of micronizer run. |
| Do | do | Gooch | Latter part of micronizer run, more representative of continuous operation. |
| Maryland Acid-washed | do | Gooch | |
| Quebec Chrysotile | Johns Manville | 4M12 | Cleaned, washed and shortened in Sprout-Waldron cutter. |
| Quebec Chrysotile Micronized. | do | 4M12 | |
| Maryland Crude | Powhatan Mining Co | | Contains 10% iron crude material for Gooch Grade. |
| South American Blue | do | BB | 5% dirt removed by dry screening. |
| Crude Canadian Chrysotile | Arthur D. Little, Inc. | −94–004 (754–M) | Not washed. |

Of the various different types of asbestos used, it appears that the Canadian Chrysotile asbestos is the best, that the African Blue variety is second best, and that the South American Blue variety is third best. The Vermont asbestos float type appears to be the least desirable variety of those tested.

Although considerable range in the dimensions of the dry asbestos fibers used for impregnation of the filter material is permitted, fibers having an average diameter of about 0.03 micron as measured by the electron microscope, with fiber lengths many times their diameters, for example, from 50 to 100 microns, appear to provide one very satisfactory grade. The dimension characteristics of the asbestos fibers will, of course, to a large extent depend upon the particular defibering or pulverizing apparatus used for disintegration. It has been found that although the asbestos fibers can be reduced to as small a diameter as possible with a general improvement in filtering efficiency, as the diameter is reduced, the lengths of the fibers should not be shortened too greatly. There are indications that if the lengths of the asbestos fibers are shortened too greatly, when the asbestos is used to impregnate the filter material, the air resistance is increased disproportionately to the filtering value.

Because of the minute dimensions involved, complete and accurate information as to the permissible range in dimensions of the asbestos fibers is difficult to obtain.

Reference may now be had to the drawing which shows apparatus by which filter paper of the type described may be impregnated with air-floated, dry asbestos fibers, on a quantity production basis, so as to make a filter material having very desirable properties and uniformity. Partially defibered asbestos is supplied to a feeder 5 consisting of a hopper 6 provided with a rotating drum 7. The drum 7 has buckets secured to the periphery thereof, and resembles an overshot water wheel. However, the drum 7 is rotated in a reverse direction from that in which an overshot water wheel normally revolves, so that the buckets serve to scrape and push the asbestos through an adjustable slot 9 located in the bottom of the hopper 6. The width of the slot or opening 9 may be adjusted by setting a closure member 10 in different positions.

From the hopper 6, the asbestos is delivered to a pulverizer 12 provided with an outlet screen indicated diagrammatically at 13. One type of pulverizer which has been found to serve very satisfactorily is the so-called Mikro-Pulverizer, Bantam model, Serial No. 6018, manufactured by the Pulverizer Machinery Co., Roselle Park, N. J. This pulverizer is a small (5 in. rotor diameter), high-speed (up to 16,000 R. P. M.) hammer mill. The asbestos to be pulverized is fed by a screw conveyor into the working area of the apparatus. The pulverized material passes out through a screen (screen 13) at the bottom and into a discharge pipe. The screen at the discharge is replaceable, permitting the use of various screen sizes for handling different materials.

In certain instances difficulty was encountered because of agglomeration of the asbestos and the plugging of the discharge screen 13. It was found that such agglomeration and plugging of the screen could be eliminated by adding a small amount (about 1%) of charcoal to the asbestos as it was fed to the pulverizer 12. However, it was noted (1) that the amount of charcoal should be kept at a minimum because of its tendency to increase the smoke penetration of the paper and (2) that the minimum amount required for obtaining the desired effect varied with the weather conditions, more being needed on days when high humidity prevailed.

From the pulverizing equipment, the pulverized asbestos is fed into a rectangular box-shaped top section 15 of an impregnating chamber indicated generally at 16. In one embodiment of the apparatus, the top section 15 was 24 inches long and wide enough to accommodate a web of paper 8 inches in width. The bottom section 17 of the impregnating chamber 16 is in the form of an inverted rectangular pyramid, the upper end of which has substantially the same dimensions as the rectangular top section 15. The upper end of the lower section 17 is covered with a heavy 6-mesh wire screen 18, and the lower, smaller end of the pyramid section 17 is attached to a vacuum pump 20. The lower section 17 and the vacuum pump 20 should be so designed that air may be sucked through the screen 18 at a linear velocity of 23 to 68 feet per minute.

In the top section 15 there is disposed a header pipe 21 connected with a source of air pressure indicated at 22. A number of air distributor pipes 23 extend from the header pipe 21, as shown. These distributor pipes 23 are provided with air holes 24 in the undersides thereof, the number of which progressively increase in concentration toward the ends of the distributor pipes 23 away from the header pipe 21. This unequal concentration of the air holes 24 compensates for the decrease in air pressure at the far ends of the distribution pipes 23.

The filter paper to be impregnated is provided on a roll 25 on one side of the impregnating chamber 16, and the paper web 26 extends through the impregnating chamber 16 and is wound up on a roll 27 on the opposite side thereof. An idler roll 28 aids in the smooth feeding of the filter paper web 26 into the impregnating chamber 16. The roll 27 is driven by friction engagement with a roll 30, driven by a constant speed electric motor 31. The strength of the filter paper sheet 26 is sufficient so that it may be unwound without breaking from the roll 25 by the tension supplied by the drive roll 30 at a paper speed of about 175 feet per minute.

As the pulverized asbestos enters the top section 15 of the impregnating chamber 16, the turbulent currents of air therein serve to evenly distribute and suspend it throughout the upper section 15. The air jets from the outlet holes 24 serve to drive and force the individual asbestos fibers into the filter paper web 26 as it passes through the chamber 16, and to blow off that portion not firmly attached to the paper causing it to recirculate. The top section 15 is provided with an exhaust vent 32 which is connected to the suction side of a blower 33, as shown. The blower 33 serves to create a slight negative pressure or vacuum in the top section 15 thereby causing a small amount of air to leak into the impregnating chamber 16 at the slots where the paper web 26 enters and leaves. This inward leakage of the air prevents the loss of asbestos through the slots. The vacuum pump 29 also helps to create the slight vacuum or negative pressure in the chamber 16.

The air resistance of the paper sheet 26 leaving the impregnating chamber 16 may be continuously measured by apparatus shown diagrammatically at 34. The resistance indicator 34 comprises an inverted rectangular pyramid having a 100 sq. cm. base covered with a coarse wire screen and fitting against the underside of the sheet 26. Air is drawn through the apparatus 34 at a rate of 85 liters per minute, and the vacuum inside the pyramid measured by a Merian (inclined tube) draft gage designed for very accurate reading in the resistance range normally used. The air resistance of the impregnated sheet 26 should be uniform and serves as an indication that proper impregnation is being obtained.

Although no specific apparatus is shown therefor in the drawing, the asbestos as received at the plant is usually so coarse that it is preferably pretreated before delivery to the hopper 6. This may be satisfactorily done by passing it through a first run in a pulverizer similar in shape to pulverizer 12. A Wiley Mill No. 1, made by Arthur H. Thomas, Inc. has also been found to be satisfactory for the preliminary treatment. This mill was driven by a 1½ H. P. motor, belted down to 800 R. P. M. The setting on knife clearances and choice of screen mesh are varied, depending on the asbestos used. A ⅛ inch knife clearance and a 0.078 inch perforated screen gave good results. Other fiber separating equipment such as ball mills and coffee mills may also be used.

As the degree to which the paper web 26 is impregnated increases, the air resistance thereof increases proportionally. It has been found, however, that for each type of asbestos fibers there is an optimum resistance to which the paper should be impregnated. That is, the filtering efficiency is improved as the degree of impregnation increases until an optimum is reached where there is very little increase in filtering efficiency with a disproportionate increase in air resistance. Generally speaking, the impregnation of a paper web having an initial air resistance of 4 mm. of water, to an air resistance of between 10 and 16 mm. of water, will give a superior filter for smokes.

It will be understood that the apparatus and arrangements shown in the drawing are illustrative of one type of impregnating apparatus which has been found to be satisfactory, but that other types of apparatus may be used.

Instead of drawing air-floated asbestos fibers through a filter paper web, as described above in connection with the drawing, finely divided asbestos fibers may be evenly sifted onto the paper web and then brushed as air is drawn through the web. Although the test results on individual sheets prepared in this manner were relatively poor, when multilayer filters were made from the sheets the test results therefor were reasonably good.

The asbestos impregnated filter paper made according to this invention has been found to equal and in most instances to exceed all of the standard requirements contained in the rigid specifications established by the Chemical Warfare Service of the Army, which is the agency responsible for this material. In addition, this new type of filter material has unusual resistance to deterioration caused by screening smokes of the oil type.

Since certain further changes may be made in the particular materials employed and procedures used, without departing from the scope of the invention, it is intended that all matter described above, or shown in the accompanying drawing, shall be interpreted as illustrative and not in a limiting sense.

I claim:

1. A filtering medium comprising, a filter paper having dispersed thereon and in the pores thereof by air filtering a finely pulverized asbestos particle filtrate, said paper comprising a soft fuzzy and porous web of cellulose fibers, said particles being frictionally held in said fibers in said web.

2. The medium of claim 1 in which said asbestos particle filtrate contains an antiagglomerating agent consisting of pulverized charcoal and constituting by weight about 1% of said particles.

SIDNEY H. KATZ.

REFERENCES CITED

The following references are of record in the file of this patent:

UNITED STATES PATENTS

| Number | Name | Date |
| --- | --- | --- |
| 321,947 | Breyer | July 14, 1885 |
| 1,349,112 | Weiss | Aug. 10, 1920 |
| 1,798,164 | Kuhn et al. | Mar. 31, 1931 |
| 2,061,570 | Frolich et al. | Nov. 24, 1936 |
| 2,063,990 | Dym | Dec. 15, 1936 |
| 2,306,222 | Patnode | Dec. 22, 1942 |
| 2,372,437 | Lathrop et al. | Mar. 27, 1945 |

FOREIGN PATENTS

| Number | Country | Date |
| --- | --- | --- |
| 19,172 | Great Britain | Aug. 26, 1911 |
| 851,577 | France | Oct. 2, 1939 |